(No Model.) 2 Sheets—Sheet 1.
T. R. MORGAN, Sr.
GUIDE FOR STEAM HAMMERS.
No. 305,836. Patented Sept. 30, 1884.
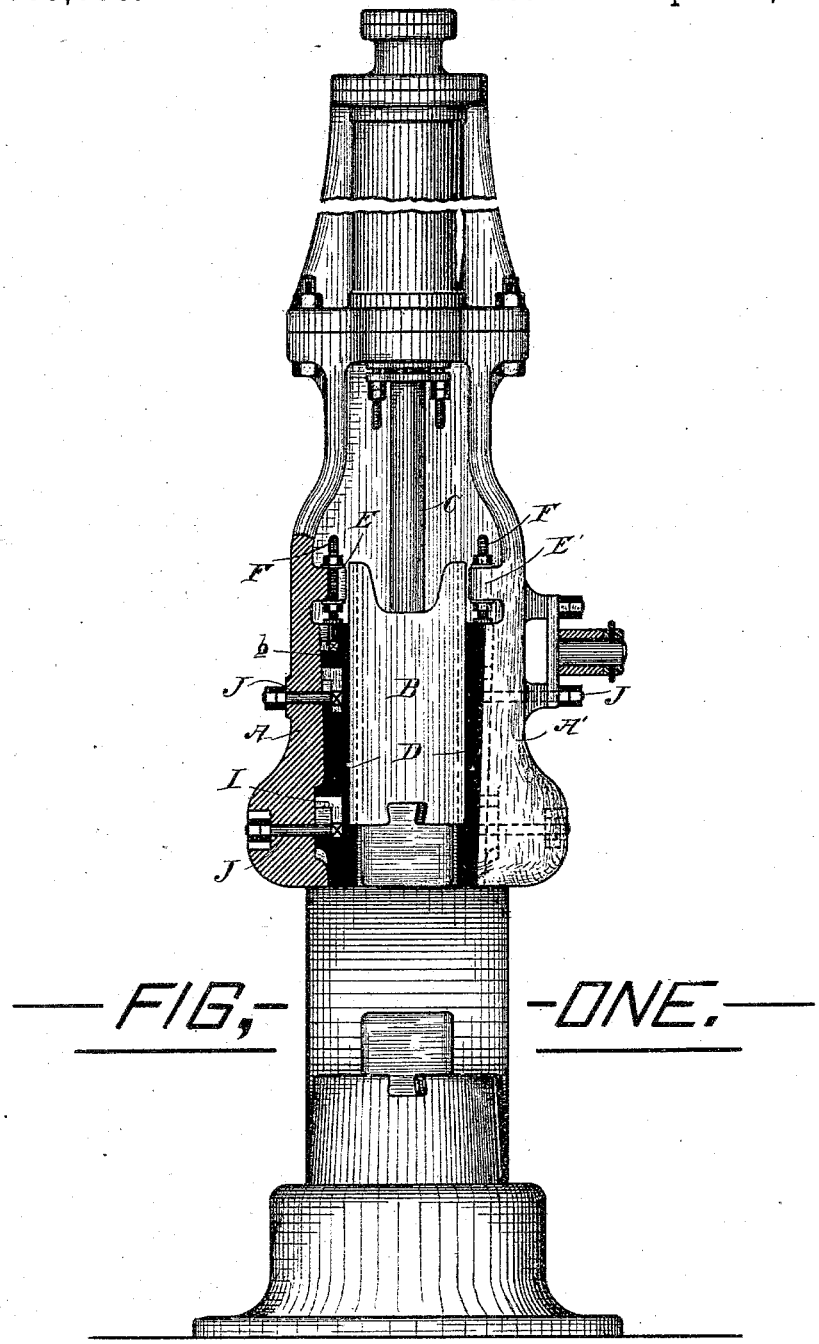
FIG. ONE.
Witnesses: Jno. R. Morgan, Henry Heir
Inventor: Thomas R. Morgan, Sr.

(No Model.) 2 Sheets—Sheet 2.
T. R. MORGAN, Sr.
GUIDE FOR STEAM HAMMERS.
No. 305,836. Patented Sept. 30, 1884.
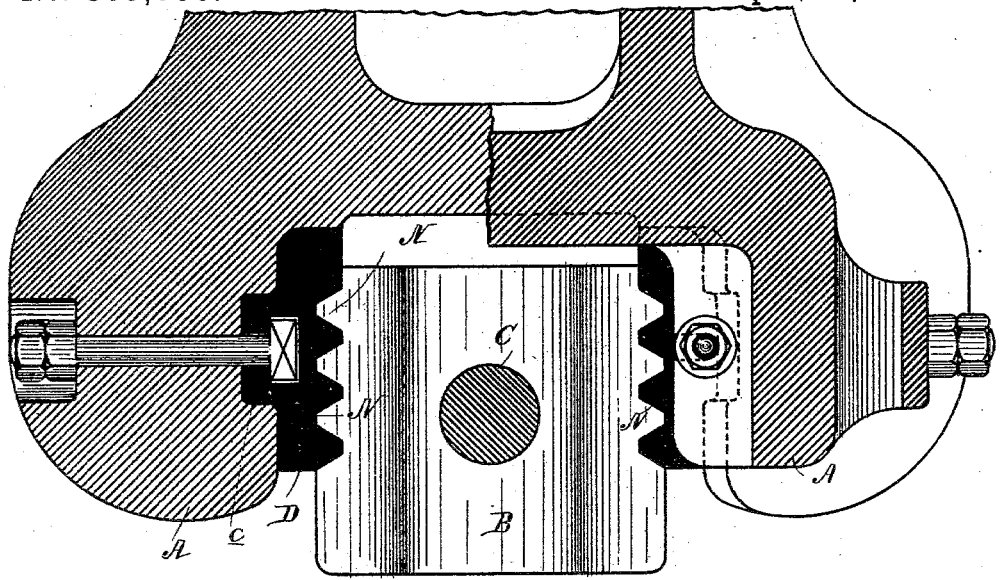
—FIG. TWO.—
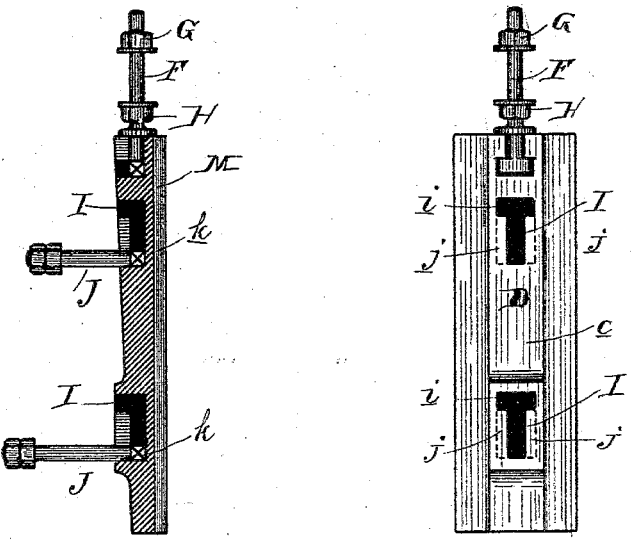
—FIG. THREE.— —FIG. FOUR—

UNITED STATES PATENT OFFICE.

THOMAS R. MORGAN, SR., OF ALLIANCE, OHIO.

GUIDE FOR STEAM-HAMMERS.

SPECIFICATION forming part of Letters Patent No. 305,836, dated September 30, 1884.

Application filed January 31, 1884. (No model.)

*To all whom it may concern:*

Be it known that I, THOMAS R. MORGAN, Sr., of Alliance, in the county of Stark and State of Ohio, have invented certain new and useful Improvements in Adjustable Guides for Steam-Hammers; and I do hereby declare the following to be a full, clear, and exact description of the invention, such as will enable others skilled in the art to which it appertains to make and use the same.

My invention relates to an improvement in adjustable guides for steam-hammers and other machines.

Heretofore guides for steam-hammers and other machines have been adjusted in various ways. In some instances the guides have been adjusted by means of transverse wedges located between the guide and the frame of the machine. Such construction is defective and objectionable, because the guide is seated against narrow bearings, while the greater portion of its length is unsupported, and hence it fails of the continuous solid bearing that is desirable for effective and durable work and wear. Again, punching-machines have been provided with vertically-adjustable wedges located between laterally-adjustable gibs and the frame for centering the slide-block. In such machines the gibs are made in sections, each complete gib requiring three separate wedges for its adjustment, and hence is expensive and complicated in its construction and adjustment.

The object of my invention is to obviate the defects and objectionable features hereinbefore set forth, and produce adjustable guides that shall be simple and economical in construction, and which may be readily adjusted, and will at all times afford a continuous solid bearing for the guide. With these ends in view I dispense with separate and independent wedges altogether, and form guides with their rear faces inclined, and also form the frame with correspondingly-inclined supporting-faces. The guides are constructed so as to be adjusted vertically to compensate for wear. For a clear understanding of my invention reference is made to the accompanying description and claim.

In the drawings, Figure 1 is a view in elevation, and partly in vertical section, of a steam-hammer to which my improved guides are applied. Fig. 2 is an irregular transverse section through the guides. Fig. 3 is a vertical section, and Fig. 4 is a front view, of one of the guides.

A A' represent the side uprights or supports of a steam-hammer. B is the ram, and C is the piston, connected at its lower end with the ram. D are the adjustable guides, the rear faces, $a$, of which are inwardly inclined from their upper to their lower ends, and fit against correspondingly-inclined bearings $b$ on the inner or adjacent sides of the uprights A A'. The rear faces of the guides are each formed with a rib, $c$, which fits within a groove in the upright, whereby each guide is retained throughout its length against any lateral displacement, but is free to be moved vertically. Uprights A A' have cast integral therewith the inwardly-projecting lugs E E', through which are inserted the suspensive bolts F, their lower ends being freely secured within the upper ends of the guides, while their upper ends are screw-threaded for the reception of the adjusting-nuts G and jam-nuts H. By loosening the nuts H the guides may be readily raised or lowered by the nuts G, and when in proper vertical adjustment firmly secured against displacement by the jam-nuts H.

Within the rear face of each guide, and near its upper and lower ends, are formed the T-shaped grooves I, the transverse slot $i$ of which is formed with straight side walls, while the vertical slot $j$ is undercut, as at $j'\ j'$, the undercut portions forming a vertically-elongated groove equal in width to the length of the transverse slot $i$ and communicating therewith. Adjusting-bolts J are employed to secure the guides snugly against the bearings on the uprights. Each bolt J is provided with an elongated head, $k$, while the body of the bolt extends through the upright, and is secured by nuts on its outer end.

To connect the bolts J with the guides, the latter are lowered until the transverse slots $i$ register with the elongated heads $k$ of the bolts, when the latter are forced inwardly, causing the heads $k$ to enter the slots $i$. The guides are then elevated, thereby causing the bolt-heads $k$ to enter the undercut grooves, and thus form a connection with the guides, so that by screwing up the nuts on the bolts J the guides may be firmly secured in place. The inner and adjusted faces, L, of the guides are constructed parallel with each other, and are furnished with grooves M, in which engage the correspondingly-shaped projections or ribs N on the side faces of the ram. This construction retains the ram against displacement.

When it is desired to adjust the guides to compensate for wear, the nuts on the suspension-bolts and on the side fastening-bolts are loosened and the guides slightly lowered, which operates to force the adjacent faces of the guides toward each other and in snug contact with the sides of the ram, owing to the wedge-shaped rear faces of the guides engaging correspondingly wedge-shaped surfaces on the uprights, and thereby tightening the nuts on the several bolts the guides are firmly retained against displacement. Thus it will be observed that the devices for adjusting the guides are simple and durable in construction, occupy very little space, and do not obstruct the operative parts of the machine, and are susceptible of easy and ready adjustment.

It is evident that slight changes might be made in the construction and relative arrangement of parts without departing from the spirit of my invention, and hence I would have it understood that I do not restrict myself to the exact construction and arrangement of parts as shown and described.

Having fully described my invention, what I claim as new, and desire to secure by Letters Patent, is—

The combination, with the hammer-frame or uprights having inclined guide bearing surfaces, of the inclined or tapering guides, the screw-bolts by which said guides are suspended and made adjustable, and the tightening-bolts for fixing said guides, substantially as set forth.

In testimony whereof I have signed this specification in the presence of two subscribing witnesses.

THOMAS R. MORGAN, SR.

Witnesses:
JOHN H. LLOYD,
SAM. S. WEBB.